(12) United States Patent
Huang et al.

(10) Patent No.: US 8,531,458 B2
(45) Date of Patent: Sep. 10, 2013

(54) METHOD OF DETERMINING POINTING OBJECT POSITION FOR THREE-DIMENSIONAL INTERACTIVE SYSTEM

(75) Inventors: Yi-Pai Huang, Hsin-Chu (TW);
Guo-Zhen Wang, Hsin-Chu (TW);
Tsung-Wei Pai, Hsin-Chu (TW);
Pi-Cheng Wu, Hsin-Chu (TW);
Chi-Mao Hung, Hsin-Chu (TW);
Wei-Min Sun, Hsin-Chu (TW);
Yi-Chien Wen, Hsin-Chu (TW);
Tsung-Hsien Hsieh, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 618 days.

(21) Appl. No.: 12/827,735

(22) Filed: Jun. 30, 2010

(65) Prior Publication Data
US 2011/0148859 A1 Jun. 23, 2011

(30) Foreign Application Priority Data

Dec. 18, 2009 (TW) .............................. 98143745 A (51) Int. Cl.
*G06T 15/00* (2011.01)
(52) U.S. Cl.
USPC ........... 345/426; 345/104; 345/173; 345/180; 345/419

(58) Field of Classification Search
USPC .......................... 345/419, 426, 173, 180, 104
See application file for complete search history.

(56) References Cited

U.S. PATENT DOCUMENTS

| 7,298,367 | B2* | 11/2007 | Geaghan et al. | 345/180 |
| 7,852,324 | B2* | 12/2010 | Chen et al. | 345/173 |
| 7,924,269 | B2* | 4/2011 | Chen et al. | 345/173 |
| 2006/0044429 | A1 | 3/2006 | Toda et al. | |

OTHER PUBLICATIONS

Huang, Yi-Pai, Auto-Stereoscopic 3D Display and its future Developments, SID Webinar, May 2012, pp. 1-92.*

* cited by examiner

*Primary Examiner* — Phu K Nguyen
(74) *Attorney, Agent, or Firm* — WPAT, PC; Justin King (57) ABSTRACT

An exemplary method of determining a pointing object position for three-dimensional interactive system, adapted for an interaction between a pointing object and a three-dimensional interaction display with embedded optical sensors. The method includes the steps of: acquiring a two-dimensional detected light intensity distribution caused by the pointing object acting on the three-dimensional interaction display; obtaining two light-shading intensity maximum values according to the two-dimensional detected light intensity distribution; and determining a one-dimensional positional information of the pointing object on a distance direction of the pointing object relative to the three-dimensional interaction display by use of the positional distance between the two light-shading intensity maximum values.

18 Claims, 6 Drawing Sheets

METHOD OF DETERMINING POINTING OBJECT POSITION FOR THREE-DIMENSIONAL INTERACTIVE SYSTEM

CROSS-REFERENCE TO RELATED APPLICATIONS

This application is based upon and claims the benefit of priority from the prior Taiwan Patent Application No. 098143745, filed Dec. 18, 2009, the entire contents of which are incorporated herein by reference.

BACKGROUND

1. Technical Field

The present invention generally relates to display technology fields and, particularly to a method of determining a pointing object position for three-dimensional interactive system.

2. Description of the Related Art

In recent years, in order to achieve more natural three-dimensional (3D) sensory images from displays, many studies have been devoted to 3D display technology developments. Furthermore, 3D interaction based on existing 3D display structure is a popular research topic.

Most existing 3D interactive systems are composed of a 3D display and extra sensing components which increase interactive system volume. When 3D interactive systems use a CCD camera as the sensing component, 3D interactive systems do not work in the region near the display panel because of a limited capturing angle. Therefore, 3D interaction without increasing system volume is an important issue.

BRIEF SUMMARY

Accordingly, the present invention is directed to a method of determining a pointing object position for three-dimensional (3D) interactive system, so as to address the issues associated with the prior art.

More specifically, a method of determining a pointing object position for 3D interactive system in accordance with an embodiment of the present invention is adapted for an interaction between a pointing object and a 3D interactive display. The 3D interactive display includes an optical sensor array and a barrier. The optical sensor array includes a plurality of first optical sensor rows and a plurality of second optical sensor rows. The first optical sensor rows and the second optical sensor rows are alternately arranged along a first direction. Each of the first optical sensor rows as well as each of the second optical sensor rows includes a plurality of optical sensors arranged along a second direction different from the first direction. The barrier is disposed spaced from the optical sensor array and at a light-sensing side of the optical sensor array. The barrier includes a plurality of opaque barrier strips arranged along the first direction, and each of the barrier strips extends along the second direction. The method includes the following steps of: acquiring a first detected light intensity distribution of the optical sensors of the first optical sensor rows and a second detected light intensity distribution of the optical sensors of the second optical sensor rows; obtaining a first light-shading intensity maximum value and a second light-shading intensity maximum value respectively according to the first detected light intensity distribution and the second detected light intensity distribution; and determining a positional information of the pointing object in a third direction by use of a positional distance between the first light-shading intensity maximum value and the second light-shading intensity maximum value in the first direction, the third direction being different from the first direction and the second direction.

In one embodiment, the step of obtaining the first light-shading intensity maximum value and the second light-shading intensity maximum value respectively according to the first detected light intensity distribution and the second detected light intensity distribution comprises: normalizing the first detected light intensity distribution and the second detected light intensity distribution to obtain a normalized first detected light intensity distribution and a normalized second detected light intensity distribution; transforming the normalized first detected light intensity distribution and the normalized second detected light intensity distribution respectively into a first light-shading intensity distribution and a second light-shading intensity distribution; and obtaining the first light-shading intensity maximum value and the second light-shading intensity maximum value respectively from the first light-shading intensity distribution and the second light-shading intensity distribution.

In one embodiment, the positional information of the pointing object in the third direction is a distance between the pointing object and the barrier in the third direction.

In one embodiment, the method further comprises the step of: taking a positional mid-point between the first light-shading intensity maximum value and the second light-shading intensity maximum value in the first direction as a positional information of the pointing object in the first direction.

In one embodiment, the method further comprises the step of: obtaining a light-receiving intensity maximum value according to a detected light intensity distribution of the optical sensors of a designated one of the first and second optical sensor rows, and taking a positional information of the light-receiving intensity maximum value in the second direction as a positional information of the pointing object in the second direction; wherein a positional information of the designated optical sensor row in the first direction is identical with the positional information of the pointing object in the first direction.

In one embodiment, the method further comprises the step of: obtaining a light-receiving intensity maximum value according to the first detected light intensity distribution and the second detected light intensity distribution, and taking a positional information of the light-receiving intensity maximum value in the second direction as a positional information of the pointing object in the second direction.

In one embodiment, the method further comprises the step of: obtaining a light-receiving intensity maximum value according to the first detected light intensity distribution and the second detected light intensity distribution, and taking positional information of the light-receiving intensity maximum value in the first direction and the second direction respectively as positional information of the pointing object in the first direction and the second direction.

A method of determining a pointing object position for 3D interactive system in accordance with another embodiment of the present invention is adapted for an interaction between a pointing object and a 3D interactive display. The 3D interactive display includes a display panel and a barrier disposed at a viewing side of the display panel. The display panel includes an embedded optical sensor array. The embedded optical sensor array includes a plurality of first optical sensor rows and a plurality of second optical sensor rows alternately arranged with the first optical sensor rows. Each of the first and second optical sensor rows includes a plurality of optical sensors. The method includes the following steps of: acquiring a light-shading intensity of each of the optical sensors of the first optical sensor rows to get a first light-shading intensity set and a light-shading intensity of each of the optical sensors of the second optical sensor rows to get a second light-shading intensity set; obtaining a first light-shading intensity maximum value and a second light-shading intensity maximum value respectively from the first light-shading intensity set and the second light-shading intensity set; and determining a one-dimensional positional information of the pointing object in a direction of the pointing object substantially vertical to the display panel by use of a positional distance between the first light-shading intensity maximum value and the second light-shading intensity maximum value.

A method of determining a pointing object position for 3D interactive system in accordance with still another embodiment of the present invention is adapted for an interaction between a pointing object and a 3D interactive display with embedded optical sensors. The method includes the following steps of: acquiring a two-dimensional detected light intensity distribution caused by the pointing object acting on the 3D interactive display; obtaining two light-shading intensity maximum values according to the two-dimensional detected light intensity distribution; and determining a one-dimensional positional information of the pointing object in a distance direction of the pointing object relative to the 3D interactive display by used of a positional distance between the two light-shading intensity maximum values.

In summary, the above-mentioned embodiments of the present invention dispose the barrier on the display panel with embedded optical sensors as visual disparity mask, and thus can display 3D images and produce 3D interaction simultaneously. Since the optical sensors are embedded into the display panel, the 3D interactive system can capture the image in the region near the display panel. As a result, the interactive range is widened to the region near display panel without increasing system volume. In the above-mentioned embodiments of the present invention, by grouping the optical sensor rows and suitably analyzing the detected light intensity distributions of the respective optical sensor row groups, the positional information in the third direction and/or the positional information in the other two directions of the pointing object interactive with the 3D interactive display can be obtained consequently.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," "vertical," etc., is used with reference to the orientation of the Figures being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Accordingly, the drawings and descriptions will be regarded as illustrative in nature and not as restrictive.

Figure 1:
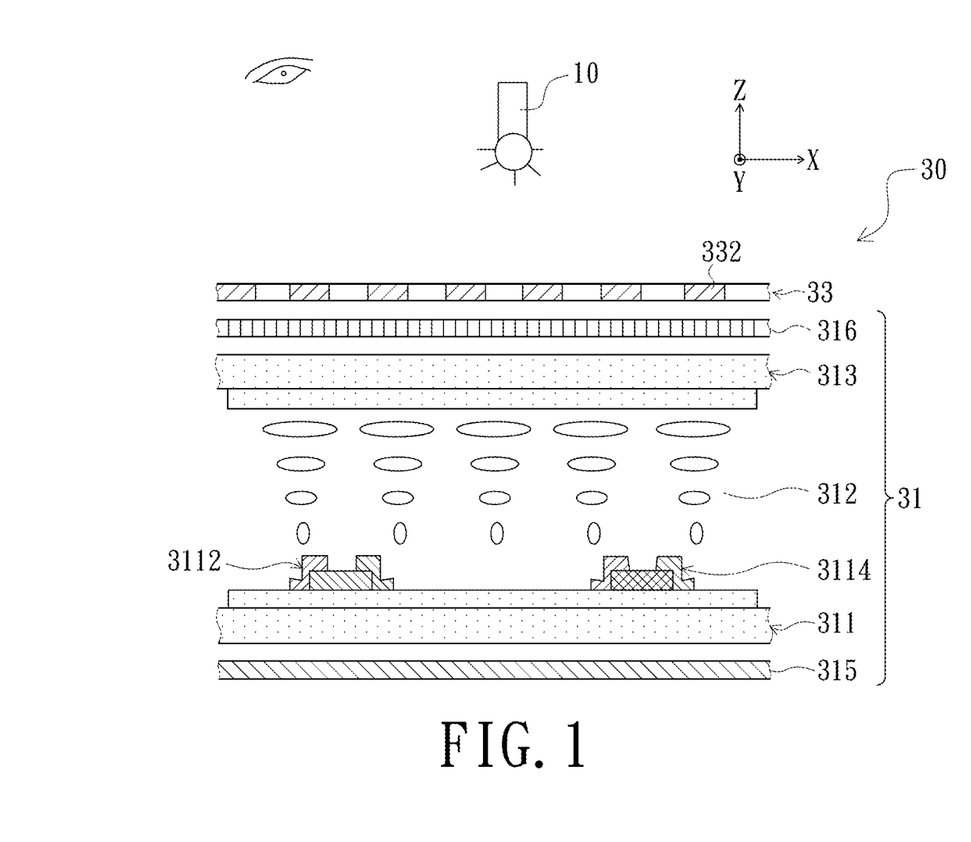
FIG. 1 is a schematic structural cross-sectional view of a 3D interactive system in accordance with an embodiment of the present invention.
Figure 2:
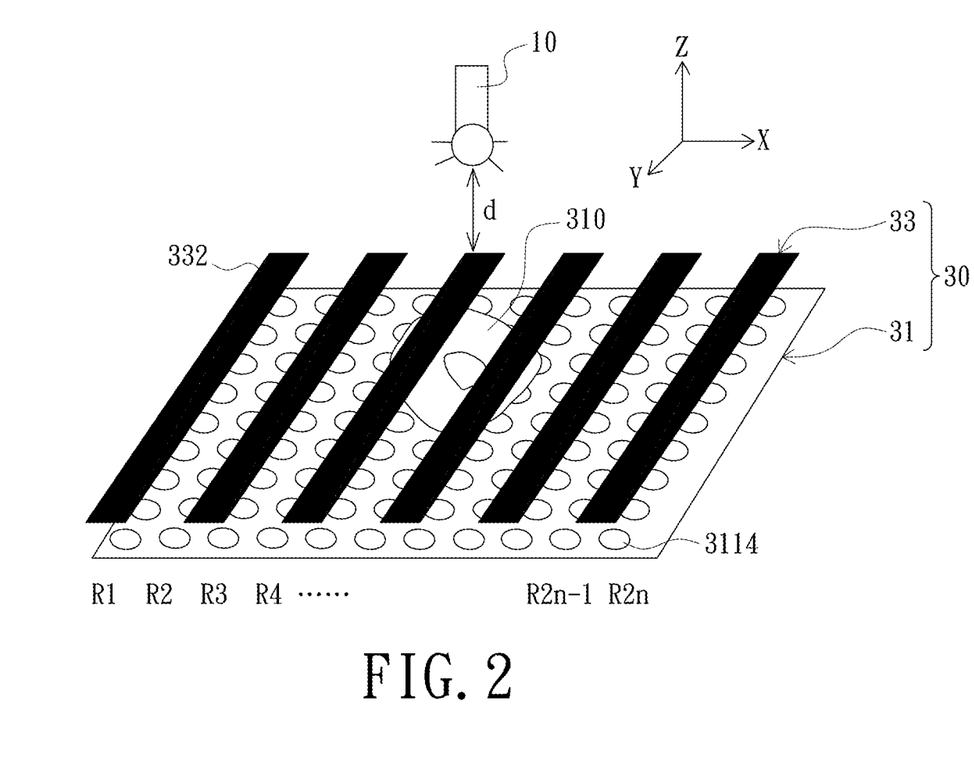
FIG. 2 shows an interaction state between the 3D interactive display and the pointing object of FIG. 1.

Referring to FIGS. 1 and 2, a method of determining a pointing object position for 3D interactive system in accordance with an embodiment of the present invention is provided. The method is adapted for an interaction between a pointing object 10 and a 3D interactive display 30. Herein, the pointing object 10 and the 3D interactive display 30 cooperatively constitute a 3D interactive system. In the illustrated embodiment, the pointing object 10 is a light-emissive pointing object can emit light rays, but not to limit the present invention. The 3D interactive display 30 includes a display panel 31 and a barrier 33 disposed at the viewing side of the display panel 31.

As illustrated in FIG. 1, the display panel 31 includes a bottom substrate 311, a liquid crystal layer 312, a top substrate 313, a bottom polarizer 315 and a top polarizer 316. The liquid crystal layer 312 is interposed between the bottom substrate 311 and the top substrate 313. The bottom polarizer 315 is disposed at the outside of the bottom substrate 311. The top polarizer 316 is disposed at the outside of the top substrate 313. The bottom substrate 311 has a plurality of thin film transistors 3112 and a plurality of optical sensors 3114 formed at the inner side thereof. FIG. 1 only shows one thin film transistor 3112 and one optical sensor 3114 for the purposed of illustration, but it is not to limit the present invention. The optical sensors 3114 can be photo-transistors, photo-diodes or other optical sensing components. Herein, the optical sensors 3114 are internally integrated into the display panel 31 and thus also are referred to as embedded optical sensors.

The barrier 33 is adhered to the viewing side of the display panel 31. The barrier 33 includes a plurality of opaque barrier strips 332 spaced from one another and arranged along the X-axis direction. Each of the barrier strips 332 extends along the Y-axis direction.

FIG. 2 illustrates an interaction state of the pointing object 10 acting on the 3D interactive display 30. As illustrated in FIG. 2, the display panel 31 of the 3D interactive display 30 includes an embedded optical sensor array constituted by a plurality of the embedded optical sensors 3114. The embedded optical sensor array includes a plurality of odd optical sensor rows R1, R3, ..., R2n-1 and a plurality of even optical sensor rows R2, R4, ..., R2n. The odd optical sensor rows R1, R3, ..., R2n-1 and the even optical sensor rows R2, R4, ..., R2n are alternately arranged along the X-axis direction. Each of the odd optical sensor rows R1, R3, ..., R2n-1 and even optical sensor rows R2, R4, ..., R2n includes a plurality of the optical sensors 3114 arranged along the Y-axis direction. The barrier 33 is disposed at the light-sensing side of the embedded optical sensor array and spaced from the embedded optical sensor array. The pointing object 10 is distant from the barrier 33 of the 3D interactive display 30 with a distance d and correspondingly induces an affected region 310 on the display panel 31. During the interaction of the pointing object 10 acting on the 3D interactive display 30, when the pointing object 10 moves up and down along a direction vertical to the display panel 31 (i.e., the Z-axis direction in the illustrated embodiment), i.e., the distance d is changed, the size of the affected region 310 is changed correspondingly, which would cause the 3D interactive display 30 to demonstrate different two-dimensional detected light intensity distributions.

A method of determining pointing object position for 3D interactive system in accordance with an embodiment of the present invention will be described below in detail with reference to FIGS. 3 through 6. The steps of the determining method will be described as follows.

Figure 3:
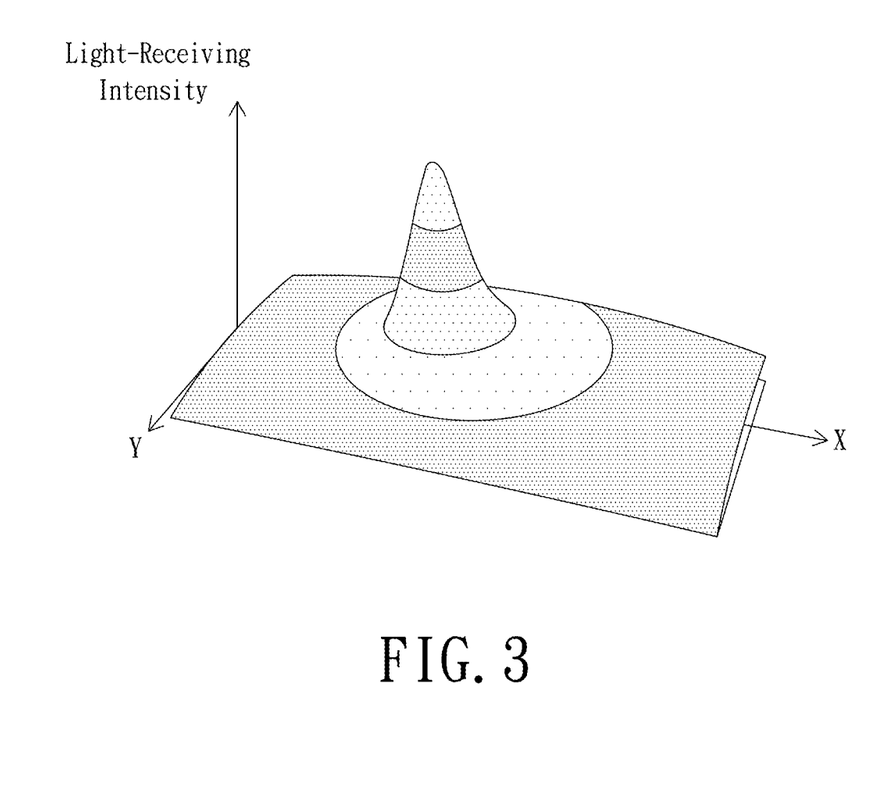
FIG. 3 shows a simulation diagram of a two-dimensional light-receiving intensity distribution caused by the pointing object acting on the 3D interactive display of FIG. 2.
Figure 4:
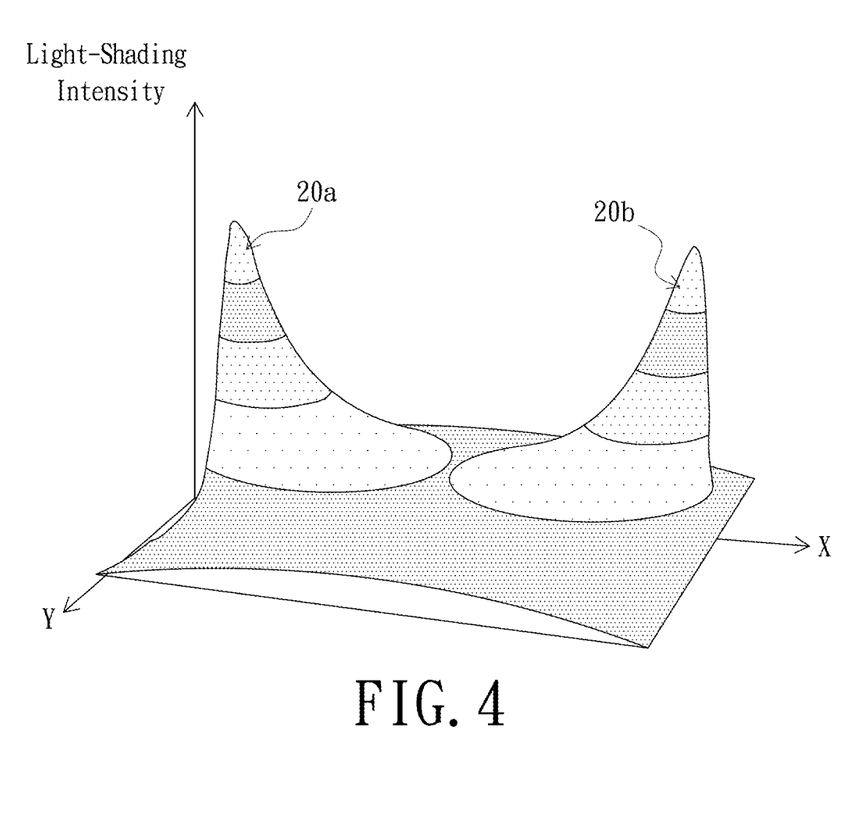
FIG. 4 shows a simulation diagram of a two-dimensional light-shading intensity distribution corresponding to the two-dimensional light-receiving intensity distribution of FIG. 3.

Referring to FIGS. 3 and 4, FIG. 3 illustrating a simulation diagram of two-dimensional light-receiving intensity distribution caused by the pointing object 10 acting on the 3D interactive display 30 and corresponding to the affected region 310, and FIG. 4 illustrating a simulation diagram of two-dimensional light-shading intensity distribution corresponding to the two-dimensional light-receiving intensity distribution of FIG. 3. Herein, the two-dimensional light-receiving intensity distribution and the two-dimensional light-shading intensity distribution both are kinds of two-dimensional detected light intensity distributions. More specifically, the two-dimensional light-receiving intensity distribution as illustrated in FIG. 3 includes a two-dimensional first light-receiving intensity distribution (not labeled) corresponding to at least a part of the odd optical sensor rows R1, R3, ..., R2n-1 and a two-dimensional second light-receiving intensity distribution (not labeled) corresponding to at least a part of the even optical sensor rows R2, R4, ..., R2n. Likewise, the two-dimensional light-shading intensity distribution as illustrated in FIG. 4 includes a two-dimensional first light-shading intensity distribution 20a corresponding to at least a part of the odd optical sensor rows R1, R3, ..., R2n-1 and a two-dimensional second light-shading intensity distribution 20b corresponding to at least a part of the even optical sensor rows R2, R4, ..., R2n. An approach of transforming the two-dimensional first and second light-receiving intensity distributions of FIG. 3 into the two-dimensional first and second light-shading intensity distributions 20a, 20b of FIG. 4 can be that: normalizing the light-receiving intensities of the first and second light-receiving intensity distributions, the light-receiving intensity maximum value being normalized to be 1; then using 1 to subtract the normalized light-receiving intensities and thereby the two-dimensional first light-shading intensity distribution 20a and the two-dimensional second light-shading intensity distribution 20b are obtained. As a result, the two-dimensional light-shading distribution (i.e., generally light-shading intensity set) as illustrated in FIG. 4 is obtained by plotting the two-dimensional first and second light-shading intensity distributions 20a, 20b in the same chart.

Moreover, the two-dimensional light-receiving intensity distribution of FIG. 3 has a light-receiving intensity maximum value (i.e., peak value), and the two-dimensional light-shading intensity distribution of FIG. 4 has two light-shading intensity maximum values. The two light-shading intensity maximum values respectively belong to the first light-shading intensity distribution 20a and the second light-shading intensity distribution 20b.

Figure 5:
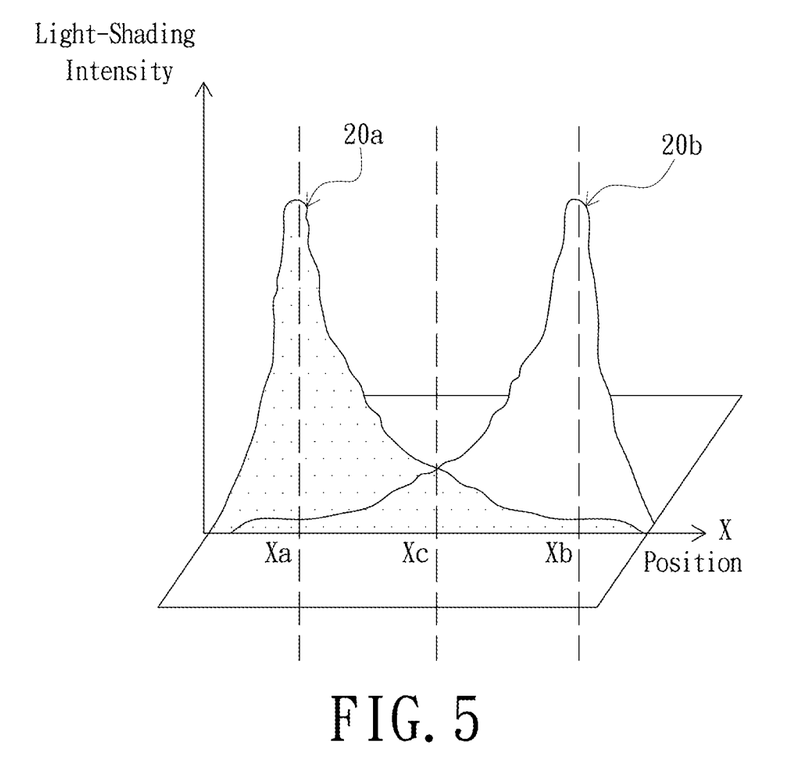
FIG. 5 shows a one-dimensional distribution of the two-dimensional light-shading intensity distribution of FIG. 4 in the X-axis direction.

Referring to FIG. 5, illustrating a one-dimensional distribution in the X-axis direction of the two-dimensional light-shading intensity distribution of FIG. 4. In particular, after obtaining the two light-shading intensity maximum values respectively belonging to the first light-shading intensity distribution 20a and the second light-shading intensity distribution 20b, positional coordinates Xa and Xb of the two light-shading intensity maximum values in the X-axis direction are acquired, and then a positional information (i.e., the value of distance d in the illustrated embodiment) of the pointing object 10 in the Z-axis direction can be calculated according to the positional coordinates Xa and Xb. Herein, a principle of calculating the value of distance d according to the positional coordinates Xa and Xb is that: when light rays emitted from the pointing object 10 pass through the barrier 33 of the 3D interactive display 30, they will be detected by the embedded optical sensors 3114 in the display panel 31; since the barrier 33 is distant from the optical sensors 3114, according to a geometric relationship, it is found that the optical sensors 3114 with a particular oblique angle relative to the pointing object 10 will be completely shaded by the barrier 332, and thus light rays emitted from the pointing object 10 with different distances d will be detected by the optical sensors 3114 with different oblique angles relative to the pointing object 10; accordingly, relationships between the light-shading intensity distributions and the distances d associated with the pointing object 10 can be acquired, the positional information of the pointing object 10 in the Z-axis direction can be obtained consequently.

In addition, a quotient of the sum of the positional coordinates Xa and Xb of the two light-shading intensity maximum values respectively belonging to the first and second light-shading intensity distributions 20a, 20b divided by two can be taken as a positional information of the pointing object 10 in the X-axis direction, i.e., the positional coordinate Xc. Herein, the positional coordinate Xc is the mid-point of the positional coordinates Xa and Xb of the two light-shading intensity maximum values.

Figure 6:
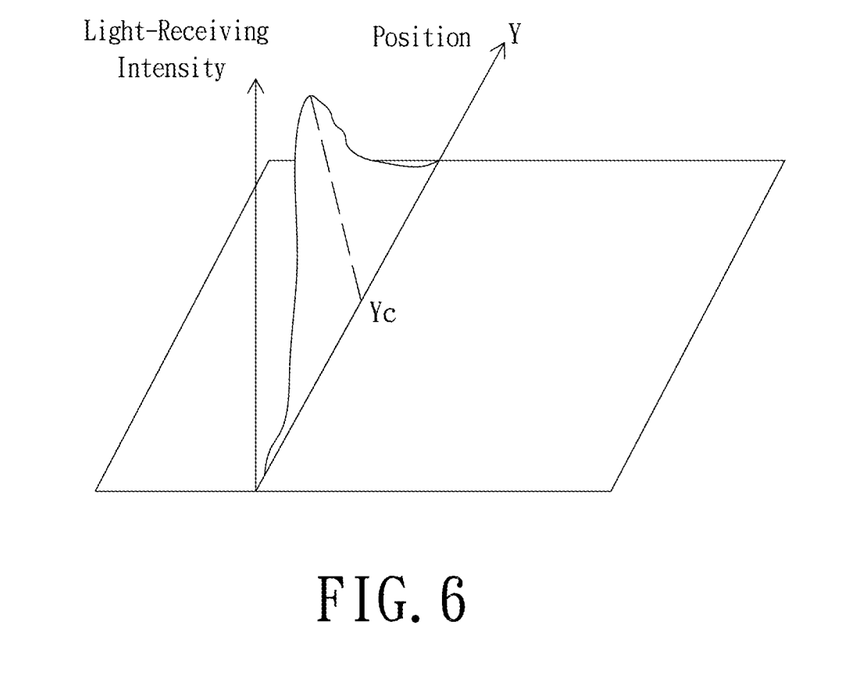
FIG. 6 shows a one-dimensional distribution of the two-dimensional light-receiving intensity distribution of FIG. 3 in the Y-axis direction.

Then, after the positional coordinate of the pointing object 10 in the X-axis direction is acquired, a one-dimensional light-receiving intensity distribution in the Y-axis direction (as illustrated in FIG. 6) of the optical sensors 3114 of a designated optical sensor row is expected to acquire. The positional coordinate of the designated optical sensor row in the X-axis direction is Xc. As seen from FIG. 6, the one-dimensional light-receiving intensity distribution has a light-receiving intensity maximum value. The positional coordinate Yc of the light-receiving intensity maximum value in the Y-axis direction is then taken as a positional coordinate of the pointing object 10 in the Y-axis direction. Hereto, the determination of positional coordinates of the pointing object 10 in spatial 3D directions is completed.

In another embodiment, the determining of the positional coordinate of the pointing object 10 in the Y-axis direction is not limited to be performed after obtaining the positional coordinate Xc of the pointing object 10 in the X-axis direction. By analyzing the light-receiving intensities of the two-dimensional light-receiving intensity distribution of FIG. 3 one by one and then obtaining a positional coordinate of a light-receiving intensity maximum value in the Y-axis direction, the positional coordinate of the pointing object 10 in the Y-axis direction also can be obtained.

In other embodiment, positional coordinates in the X-axis direction and the Y-axis direction of the light-receiving intensity maximum value of the two-dimensional light-receiving intensity distribution as illustrated in FIG. 3 respectively are taken as positional coordinates of the pointing object 10 in the X-axis direction and the Y-axis direction.

In summary, the above-mentioned embodiments of the present invention dispose the barrier on the display panel with embedded optical sensors as visual disparity mask, and thus can display 3D images and produce 3D interaction simultaneously. Since the optical sensors are embedded into the display panel, the 3D interactive system can capture the image in the region near the display panel. As a result, the interactive range is widened to the region near display panel without increasing system volume. Moreover, by grouping the optical sensor rows and suitably analyzing the detected light intensity distributions of the respective optical sensor row groups, the positional information in the Z-axis direction and/or the positional information in the other two directions (e.g., the X-axis and Y-axis directions) of the pointing object interactive with the 3D interactive display can be obtained consequently.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of determining a pointing object position for three-dimensional interactive system, adapted for an interaction between a pointing object and a three-dimensional interactive display, wherein the three-dimensional interactive display comprises an optical sensor array and a barrier, the optical sensor array comprises a plurality of first optical sensor rows and a plurality of second optical sensor rows, the first optical sensor rows and the second optical sensor rows are alternately arranged along a first direction, each of the first optical sensor rows as well as each of the second optical sensor rows comprises a plurality of optical sensors arranged along a second direction different from the first direction, the barrier is disposed spaced from the optical sensor array and at a light-sensing side of the optical sensor array, the barrier comprises a plurality of barrier strips arranged along the first direction, and each of the barrier strips extends along the second direction; the method comprising the steps of:

acquiring a first detected light intensity distribution of the optical sensors of the first optical sensor rows and a second detected light intensity distribution of the optical sensors of the second optical sensor rows;

obtaining a first light-shading intensity maximum value and a second light-shading intensity maximum value respectively according to the first detected light intensity distribution and the second detected light intensity distribution; and determining a positional information of the pointing object in a third direction by use of a positional distance between the first light-shading intensity maximum value and the second light-shading intensity maximum value in the first direction, the third direction being different from the first direction and the second direction.

2. The method as claimed in claim 1, wherein the step of obtaining a first light-shading intensity maximum value and a second light-shading intensity maximum value respectively according to the first detected light intensity distribution and the second detected light intensity distribution comprises:

normalizing the first detected light intensity distribution and the second detected light intensity distribution to obtain a normalized first detected light intensity distribution and a normalized second detected light intensity distribution;

transforming the normalized first detected light intensity distribution and the normalized second detected light intensity distribution respectively into a first light-shading intensity distribution and a second light-shading intensity distribution; and obtaining the first light-shading intensity maximum value and the second light-shading intensity maximum value respectively from the first light-shading intensity distribution and the second light-shading intensity distribution.

3. The method as claimed in claim 1, wherein the positional information of the pointing object in the third direction is a positional distance of the pointing object relative to the barrier in the third direction.

4. The method as claimed in claim 1, further comprising the step of:

taking a positional mid-point between the first light-shading intensity maximum value and the second light-shading intensity maximum value in the first direction as a positional information of the pointing object in the first direction.

5. The method as claimed in claim 4, further comprising the step of:

obtaining a light-receiving intensity maximum value according to a detected light intensity distribution of the optical sensors of a selected one of the first and second optical sensor rows, and taking a positional information of the light-receiving intensity maximum value in the second direction as a positional information of the pointing object in the second direction, wherein a positional information of the selected optical sensor row in the first direction is the same as the positional information of the pointing object in the first direction.

6. The method as claimed in claim 4, further comprising the step of:

obtaining a light-receiving intensity maximum value according to both the first detected light intensity distribution and the second detected light intensity distribution, and taking a positional information of the light-receiving intensity maximum value in the second direction as a positional information of the pointing object in the second direction.

7. The method as claimed in claim 1, further comprising the step of:

obtaining a light-receiving intensity maximum value according to both the first detected light intensity distribution and the second detected light intensity distribution, and taking positional information of the light-receiving intensity maximum value in the first direction and the second direction respectively as positional information of the pointing object in the first direction and the second direction.

8. A method of determining a pointing object position for three-dimensional interactive system, adapted for an interaction between a pointing object and a three-dimensional interactive display, wherein the three-dimensional interactive display comprises a display panel and a barrier disposed at a viewing side of the display panel, the display panel comprises an embedded optical sensor array, the embedded optical sensor array comprises a plurality of first optical sensor rows and a plurality of second optical sensor rows arranged alternately with the first optical sensor rows, each of the first optical sensor rows as well as each of the second optical sensor rows comprises a plurality of optical sensors; the method comprising steps of:
- acquiring a light-shading intensity of each of the optical sensors of the first optical sensor rows to get a first light-shading intensity set and a light-shading intensity of each of the optical sensors of the second optical sensor rows to get a second light-shading intensity set;
- obtaining a first light-shading intensity maximum value and a second light-shading intensity maximum value respectively from the first light-shading intensity set and the second light-shading intensity set; and
- determining a first-dimensional positional information of the pointing object in a direction of the pointing object substantially perpendicular to the display panel by using a positional distance between the first light-shading intensity maximum value and the second light-shading intensity maximum value.

9. The method as claimed in claim 8, wherein the first-dimensional positional information is a distance between the pointing object and the barrier.

10. The method as claimed in claim 8, further comprising the step of:
- adding positional coordinates of the first and second light-shading intensity maximum values in the direction along which the first optical sensor rows and the second optical sensor rows alternately arranged, and then taking a quotient of the sum divided by two as a second-dimensional positional information of the pointing object.

11. The method as claimed in claim 10, further comprising the step of:
- obtaining a light-receiving intensity maximum value from light-receiving intensities of the optical sensors of a designated one of the first and second optical sensor rows, and taking a positional coordinate of the light-receiving intensity maximum value in an extending direction of the first and second optical sensor rows as a third-dimensional positional information of the pointing object, wherein a positional coordinate of the designated optical sensor row in the direction along which the first optical sensor rows and the second optical sensor rows alternately arranged is identical with the second-dimensional positional information of the pointing object.

12. The method as claimed in claim 10, further comprising the step of:
- obtaining a light-receiving intensity maximum value from light-receiving intensities of the optical sensors of the first and second optical sensor rows, and taking a positional coordinate of the light-receiving intensity maximum value in an extending direction of the first and second optical sensor rows as a third-dimensional positional information of the pointing object.

13. The method as claimed in claim 8, further comprising the step of:
- obtaining a light-receiving intensity maximum value from light-receiving intensities of the optical sensors of the first and second optical sensor rows, and taking two-dimensional positional coordinates of the light-receiving intensity maximum value respectively as a second-dimensional positional information and a third-dimensional positional information of the pointing object.

14. A method of determining a pointing object position for three-dimensional interactive system, adapted for an interaction between a pointing object and a three-dimensional interactive display with embedded optical sensors; wherein the optical sensors form an optical sensor array, the optical sensor array comprises a plurality of first optical sensor rows and a plurality of second optical sensor rows, the first optical sensor rows and the second optical sensor rows are alternately arranged along a first direction, and the optical sensors of each of the first optical sensor rows as well as each of the second optical sensor rows are arranged along a second direction different from the first direction; the three-dimensional interactive display further comprises a barrier, the barrier is disposed spaced from the optical sensor array and at a light-sensing side of the optical sensor array, the barrier comprises a plurality of barrier strips arranged along the first direction, and each of the barrier strips extends along the second direction; the method comprising steps of:
- acquiring a two-dimensional detected light intensity distribution caused by the pointing object acting on the three-dimensional interactive display;
- obtaining two light-shading intensity maximum values respectively corresponding to the first optical sensor rows and the second optical sensor rows, according to the two-dimensional detected light intensity distribution; and
- determining a first-dimensional positional information of the pointing object in a distance direction of the pointing object relative to the three-dimensional interactive display by use of a positional distance of the two light-shading intensity maximum values.

15. The method as claimed in claim 14, wherein the first-dimensional positional information is a distance between the pointing object and the three-dimensional interactive display.

16. The method as claimed in claim 14, further comprising the step of:
- taking a one-dimensional coordinate of a positional midpoint of the two light-shading intensity maximum values as a second-dimensional positional information of the pointing object.

17. The method as claimed in claim 16, further comprising the step of:
- obtaining a light-receiving intensity maximum value according to the two-dimensional detected light intensity distribution, and taking a one-dimensional positional coordinate of the light-receiving intensity maximum value as a third-dimensional positional information of the pointing object.

18. The method as claimed in claim 14, further comprising the step of:
- obtaining a light-receiving intensity maximum value according to the two-dimensional detected light intensity distribution, and taking two-dimensional positional coordinates of the light-receiving intensity maximum value respectively as a second-dimensional positional information and a third-dimensional positional information of the pointing object.

* * * * *